United States Patent
Mark et al.

(10) Patent No.: US 10,891,338 B1
(45) Date of Patent: Jan. 12, 2021

(54) SYSTEMS AND METHODS FOR PROVIDING INFORMATION

(71) Applicant: Palantir Technologies Inc., Palo Alto, CA (US)

(72) Inventors: Alexander Mark, New York, NY (US); Ashley Einspahr, Palo Alto, CA (US); Andrew Elder, New York, NY (US); Daniel Cervelli, Mountain View, CA (US); Ryan Beiermeister, San Francisco, CA (US); Sharon Hao, Redwood City, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 273 days.

(21) Appl. No.: 15/957,598

(22) Filed: Apr. 19, 2018

Related U.S. Application Data

(60) Provisional application No. 62/539,336, filed on Jul. 31, 2017.

(51) Int. Cl.
*G06F 16/93* (2019.01)
*G06F 16/33* (2019.01)
*G06F 16/25* (2019.01)

(52) U.S. Cl.
CPC ............ *G06F 16/93* (2019.01); *G06F 16/258* (2019.01); *G06F 16/3344* (2019.01)

(58) Field of Classification Search
CPC ..... G06F 16/93; G06F 16/3344; G06F 16/258
USPC ........................................................ 707/756
See application file for complete search history.

(56) References Cited

U.S. PATENT DOCUMENTS

| 3,747,757 A | 7/1973 | Freis et al. |
| 4,778,219 A | 10/1988 | Wilczynski et al. |
| 7,933,843 B1 * | 4/2011 | von Groll .............. G06Q 50/01 705/319 |
| 8,700,620 B1 | 4/2014 | Lieberman |

(Continued)

FOREIGN PATENT DOCUMENTS

WO  WO-2015175548 A1 * 11/2015 ....... G06F 16/90335

OTHER PUBLICATIONS

Chen et al., "Context-Aware Mashup for Smart Mobile Devices," 2012 IEEE Asia-Pacific Services Computing Conference Year: 2012, pp. 179-186.

(Continued)

*Primary Examiner* — Phuong Thao Cao
(74) *Attorney, Agent, or Firm* — Sheppard Mullin Richter & Hampton LLP

(57) ABSTRACT

Systems and methods are provided for providing information. A given document that includes structured information (e.g., properties, attribute-value pairs, etc.) and/or unstructured information (e.g., narratives, blobs of text, etc.) may be accessed. Connections between the document and other documents may be determined based on the structured information. Connections between the document and other objects may be determined based on the structured information. The unstructured information may be formatted into formatted information. Formatting of the unstructured information may facilitate users' comprehension/utilization of the information. An interface (e.g., user interface, API) enabling presentation of (1) the formatted information and (2) the connections of the document may be provided.

20 Claims, 7 Drawing Sheets

(56) References Cited

U.S. PATENT DOCUMENTS

| | | | |
|---|---|---|---|
| 9,247,021 B1* | 1/2016 | Obbard | G06F 16/248 |
| 9,348,880 B1 | 5/2016 | Kramer et al. | |
| 9,483,455 B1* | 11/2016 | Bastide | G06F 16/3326 |
| 9,514,205 B1 | 12/2016 | Yazicioglu et al. | |
| 9,514,414 B1 | 12/2016 | Rosswog et al. | |
| 9,612,723 B1 | 4/2017 | Elliot et al. | |
| 9,645,999 B1* | 5/2017 | Ciulla | G06F 16/358 |
| 9,760,606 B1 | 9/2017 | Wilczynski et al. | |
| 10,282,562 B1* | 5/2019 | Speasl | H04N 21/835 |
| 10,606,866 B1* | 3/2020 | Funk | G06F 16/951 |
| 2002/0007373 A1* | 1/2002 | Blair | G06F 16/34 715/223 |
| 2004/0064401 A1* | 4/2004 | Palaghita | G06Q 40/02 705/38 |
| 2004/0093344 A1 | 5/2004 | Berger et al. | |
| 2004/0133582 A1* | 7/2004 | Howard | G06K 9/00221 |
| 2005/0273453 A1* | 12/2005 | Holloran | G06Q 10/10 |
| 2006/0197764 A1* | 9/2006 | Yang | G06T 13/80 345/473 |
| 2007/0005650 A1* | 1/2007 | Coen | G06Q 30/0201 |
| 2007/0088704 A1* | 4/2007 | Bourne | G06F 16/958 |
| 2008/0010605 A1* | 1/2008 | Frank | G06F 16/38 715/765 |
| 2009/0100030 A1* | 4/2009 | Isakson | G06F 16/436 |
| 2009/0204590 A1* | 8/2009 | Yaskin | G06F 16/93 |
| 2011/0282892 A1* | 11/2011 | Castellani | G06F 16/242 707/766 |
| 2012/0303645 A1* | 11/2012 | Kulkarni-Puranik | G06F 40/131 707/756 |
| 2012/0331557 A1* | 12/2012 | Washington | G06Q 20/4016 726/26 |
| 2013/0155068 A1* | 6/2013 | Bier | G06F 16/901 345/440 |
| 2013/0191303 A1* | 7/2013 | Santarlas | G06Q 50/18 705/342 |
| 2013/0325881 A1* | 12/2013 | Deshpande | G06F 16/955 707/755 |
| 2014/0058723 A1* | 2/2014 | Shen | G06F 40/247 704/9 |
| 2014/0180943 A1* | 6/2014 | Priddy, Jr. | G06Q 10/105 705/319 |
| 2014/0278212 A1* | 9/2014 | Torgersrud | G01S 5/0009 702/150 |
| 2015/0100366 A1* | 4/2015 | Hollis | G06Q 10/06313 705/7.23 |
| 2015/0220539 A1* | 8/2015 | Lambert | G06F 16/338 707/723 |
| 2015/0324454 A1* | 11/2015 | Roberts | G06F 16/93 707/734 |
| 2016/0019301 A1* | 1/2016 | Goldenstein | G06F 16/248 707/722 |
| 2016/0182707 A1* | 6/2016 | Gabel | G06F 3/0482 455/404.2 |
| 2016/0203130 A1* | 7/2016 | Roque | G06F 16/93 707/741 |
| 2016/0232143 A1* | 8/2016 | Fickenscher | G06F 16/1794 |
| 2016/0334974 A1 | 11/2016 | Gray et al. | |
| 2016/0344828 A1* | 11/2016 | Hausler | G06F 16/9535 |
| 2016/0357366 A1* | 12/2016 | Migos | G06T 13/00 |
| 2016/0366546 A1* | 12/2016 | Yamasaki | H04W 4/029 |
| 2017/0011479 A1* | 1/2017 | Morimoto | G06Q 50/18 |
| 2017/0011481 A1* | 1/2017 | Morimoto | G06Q 30/0185 |
| 2017/0063899 A1* | 3/2017 | Muddu | G06N 5/022 |
| 2017/0300565 A1* | 10/2017 | Calapodescu | G06F 16/353 |
| 2017/0322959 A1* | 11/2017 | Tidwell | G06F 21/55 |
| 2018/0046764 A1* | 2/2018 | Katwala | G06F 40/295 |
| 2018/0082240 A1* | 3/2018 | Meyerzon | G06F 16/24575 |
| 2018/0176336 A1* | 6/2018 | Laub | H04L 67/28 |
| 2019/0018893 A1* | 1/2019 | Weiss | G06F 40/30 |
| 2019/0347340 A1* | 11/2019 | Wilczynski | G06F 16/248 |

OTHER PUBLICATIONS

Garcia et al., "A Matchmaking Algorithm for Resource Discovery in Multi-user Settings," 2014 IEEE/WIC/ACM International Joint Conferences on Web Intelligence (WI) and Intelligent Agent Technologies (IAT) Year: 2014, vol. 3, pp. 352-359.

Lin et al., "PRADA: Prioritized Random Access with Dynamic Access Barring for MTC in 3GPP LTE-A Networks," IEEE Transactions on Vehicular Technology Year: 2014, vol. 63, Issue 5, pp. 2467-2472.

Na et al., "Design of Location-based Directory Facilitator in Context-Aware Environment," 2008 10th International Conference on Advanced Communication Technology Year: 2008, vol. 3, pp. 2107-2110.

* cited by examiner

200

ID #### LOREM IPSUM DOLOR SIT AMET ACRONYM, CONSECTETUER ADIPISCING ELIT TERM-D TERM-A. MAECENAS PORTTITOR CONGUE MASSA FIRSTNAME LASTNAME, $######. FUSCE POSUERE, MAGNA SED PULVINAR ULTRICIES, ##/##/## PURUS LECTUS TERM-B. MALESUADA LIBERO, TERM-B SIT AMET COMMODO. MAGNA EROS QUIS URNA E-ADD@MISC.COM. NUNC VIVERRA IMPERDIET TERM-A. NUNC VIVERRA TERM-C IMPERDIET ENIM, $#### FUSCE EST ##/###/## VIVERRA IMPERDIET #########, $#### FUSCE EST ##/###/## VIVERRA IMPERDIET #########, $#### FUSCE EST ##/###/## VIVERRA IMPERDIET #########, $#### FUSCE EST ##/###/## VIVERRA IMPERDIET #########, $#### FUSCE EST ##/###/## VIVERRA IMPERDIET #########.

250

ID ####

Lorem ipsum dolor sit amet ACRONYM, consectetuer adipiscing elit *term-D term-A*. Maecenas porttitor congue massa Firstname Lastname, $######. Fusce posuere, magna sed pulvinar ultricies, ##/###/## purus lectus *Term-B*. Malesuada libero, *Term-B* sit amet commodo. Magna eros quis urna e-add@misc.com. Nunc viverra imperdiet *term-A*.

Nunc viverra *term-C* imperdiet enim, $#### fusce est ##/###/## viverra imperdiet #########, $#### fusce est ##/###/## viverra imperdiet #########, $#### fusce est ##/###/## viverra imperdiet #########, $#### fusce est ##/###/## viverra imperdiet #########, $#### fusce est ##/###/## viverra imperdiet #########.

FIGURE 2

SYSTEMS AND METHODS FOR PROVIDING INFORMATION

CROSS REFERENCE TO RELATED APPLICATIONS

This application claims the benefit under 35 U.S.C. § 119(e) of U.S. Provisional Application Ser. No. 62/539,336, filed Jul. 31, 2017, the content of which is incorporated by reference in its entirety into the present disclosure.

FIELD OF THE INVENTION

This disclosure relates to approaches for providing information.

BACKGROUND

Under conventional approaches, information (e.g., documents) relating to an investigation may be collected for analysis and viewing from a variety of data sources. In many instances, such information can be provided in various different formats (e.g., structured information, unstructured information, etc.). In general, it can be difficult for users to effectively analyze and utilize such disparate forms of information.

SUMMARY

Various embodiments of the present disclosure may include systems, methods, and non-transitory computer readable media configured to provide information. A given document that includes structured information (e.g., properties, attribute-value pairs, etc.) and/or unstructured information (e.g., narratives, blobs of text, etc.) may be accessed. Connections between the document and other documents may be determined based on the structured information. Connections between the document and other objects may be determined based on the structured information. The unstructured information may be formatted into formatted information. Formatting of the unstructured information may facilitate users' comprehension/utilization of the information. An interface (e.g., user interface, API) enabling presentation of (1) the formatted information and (2) the connections of the document may be provided.

In some embodiments, the unstructured information may be formatted based at least in part on the structured information. In some embodiments, formatting the unstructured information into the formatted information may include changing at least one of capitalization, typography, or spacing of the unstructured information.

In some embodiments, the interface may further enable searching for the document. In some embodiments, key terms within the document may be identified, and the interface may further enable presentation of highlights of the key terms. The key terms may be identified by matching one or more preset (or specified) terms. The key terms may be identified based on analysis of the document, the other documents, or the other objects.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2 illustrates an example formatting of unstructured information into formatted information, in accordance with various embodiments.

DETAILED DESCRIPTION

Figure 1:
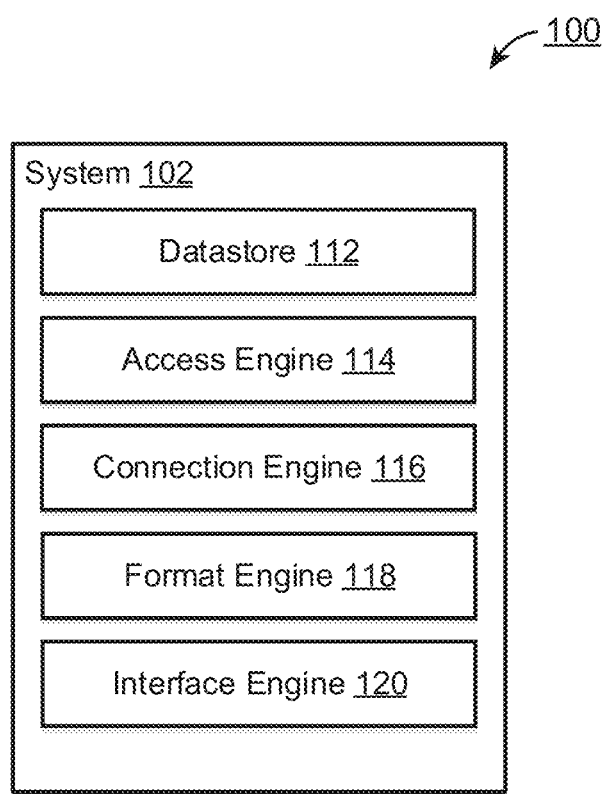
FIG. 1 illustrates an example environment for providing information, in accordance with various embodiments.

A claimed solution rooted in computer technology overcomes problems specifically arising in the realm of computer technology. In various implementations, a computing system may access a document that includes structured information (e.g., properties, attribute-value pairs, etc.) and/ or unstructured information (e.g., narratives, blobs of text, etc.). Connections (or associations) between the document and other documents may be determined based on the structured information. Similarly, connections (or associations) between the document and other objects may also be determined based on the structured information. The unstructured information may be formatted into formatted information. Formatting of the unstructured information may facilitate users' comprehension/utilization of the information. An interface (e.g., user interface, API) enabling presentation of (1) the formatted information and (2) the connections of the document may be provided.

In some embodiments, the unstructured information may be formatted based at least in part on the structured information. For example, the structured information may indicate/include information on how the unstructured information should be formatted.

In some embodiments, formatting the unstructured information into the formatted information may include changing at least one of capitalization (e.g., ALLCAPS to Sentence Caps), typography (e.g., color, font, size, italics, bold, underline), or spacing of the unstructured information (e.g., tabs, paragraphs). Different information/types of information (e.g., currency amounts, dates, physical/email addresses, phone numbers) may be changed differently (e.g., different color, different font, different size).

In some embodiments, the interface may further enable searching for the document. For example, the document may be searched for among other documents using search terms, filters, and/or other searching methods.

In some embodiments, the computing system may identify key terms within the document, and the interface may further enable presentation of highlights of the key terms. In some embodiments, the key terms may be identified by matching one or more preset (or specified) terms. For example, the key terms may be identified based on matching of terms within the document with previously entered preset terms. In some embodiments, the key terms may be identified based on analysis of the document, the other documents, or the other objects. For example, the key terms may be identified based on detecting commonalities among the document and other documents/objects.

In some embodiments, the interface may provide other information relating to the document. For example, the interface may provide information relating to terms identified in the document, counts of those terms within the document, the properties of the document, other documents/objects (e.g., entities) related to the document. The interface may provide visualization of the document/information related to the document, such as a graphical view of the connections of the document and/or geographical information (e.g., map) relating to the document.

The approach disclosed herein enables presentation of information in a more digestible format for users. Information within a document may be formatted for presentation to users. Formatting of the information within the document may include identifying key terms within the document, distinguishing certain information within the document via different capitalization, topography, and spacing. Formatting of the information may facilitate users' analysis or utilization of the information. Similarly, the approach enables presentation of the connections of documents (to other documents/objects) to provide additional information (e.g., context) regarding the document.

FIG. 1 illustrates an example environment 100 for providing information, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. In various embodiments, the computing system 102 may include a datastore 112, an access engine 114, a connection engine 116, a format engine 118, and an interface engine 120. The datastore 112 may include structured and/or unstructured sets of data that can be divided/extracted for provisioning when needed by one or more components of the environment 100. The environment 100 may also include one or more datastores that is accessible to the computing system 102 (e.g., via one or more network(s)). In some embodiments, the datastore(s) may include various databases, application functionalities, application/data packages, and/or other data that are available for download, installation, and/or execution. While the computing system 102 is shown in FIG. 1 as a single entity, this is merely for ease of reference and is not meant to be limiting. One or more components/functionalities of the computing system 102 described herein may be implemented in a single computing device or multiple computing devices.

In various embodiments, the access engine 114 may be configured to access one or more documents including structured information and unstructured information. Document(s) may be accessed from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Document(s) may be accessed from one or more databases (e.g., the datastore 112). Document(s) may be stored within a single file or across multiple files. For example, a document may have been ingested into a database (e.g., the datastore 112) as an object, and the access engine 114 may retrieve the object to access the document. The database (e.g., the datastore 112) may store other objects representing other information. For example, the database may store objects representing physical things/occurrences (e.g., persons, physical objects, locations, events) or non-physical things/occurrences (e.g., investigations, claims/demands of rights, time moments/durations).

In general, a document may refer to a collection of information. For example, a document may refer to a collection of visual information (e.g., text, image, video), audio information (e.g., sound recording, music), and/or other information. A document may be stored as one or more electronic files. Information within a document may relate to (e.g., describe) one or more subjects. A subject of a document may be a physical thing/occurrence (e.g., a person, a physical object, a location, an event) or a non-physical thing/occurrence (e.g., an investigation, a claim/demand of rights, a time moment/duration).

Information within a document may be organized in sections and/or as a stream of information. Information within a document may include structured information and unstructured information. Structured information may refer to information stored according to a certain structure/organization/pattern. Structured information may provide characteristics (e.g., properties, attribute-value pairs) of the document/information within the document. Unstructured information may refer to information stored without any particular structure/organization/pattern or information stored using structure/organization/pattern that is not conducive to users' comprehension/utilization of the information. Unstructured information may provide details (e.g., narratives, blobs of text) regarding the subject(s) of the document. Unstructured information may not be formatted to facilitate users' comprehension/utilization of the information.

For example, a document may include information relating to an event. The document may include structured information relating to the event. The structured information may be stored in particular location of the document (e.g., header), as metadata of the document, and/or as one or more files associated with the document. The structured information may provide/identify characteristics of the event and/or unstructured information relating to the event. For example, the structured information may provide/identify entities (e.g., person(s), organization(s), thing(s)) involved in the event, an activity/topic of interest in the event, properties of the entities and/or activity/topic of interest, and/or other information. In some embodiments, the structured information may identify particular information of importance/potential importance (e.g., key terms) in the unstructured information.

The structured information may provide other information relating to the document, such as the name of the document (e.g., file name), the type of the document (e.g., file type), one or more related documents (e.g., document(s) including information relating to a related event), one or more groups (e.g., libraries) to which the document belongs, and/or other information relating to the document.

The document may include unstructured information that provides details regarding one or more subjects of the document. For example, unstructured information may provide details regarding an event. For example, the unstructured information may include a narrative relating to the event. The narrative relating to the event may not be formatted to facilitate users' comprehension/utilization of the narrative. For example, the narrative may be provided within the document as lower-case/ALLCAPS text, the narrative may not utilize different typography to highlight certain information within the narrative, and/or the narrative may not include spacing that allows users to easily distinguish groupings/sets of information.

In some embodiments, the access engine 114 may identify the structured information and the unstructured information within the document. For example, a person may have entered characteristics and narratives relating to an event using a form. The form may include different fields for a person to enter characteristics and narrative relating to the event. Based on where the information was entered within the form, the access engine 114 may determine the structured information (e.g., characteristics) and unstructured information (e.g., narratives) relating to the event.

In various embodiments, the connection engine 116 may be configured to determine connections (or associations) between (1) a document and other documents, and (2) the document and other objects (representing physical things/occurrences and/or non-physical things/occurrences). The connections of the document may be determined based on the structured information. The connection engine 116 may determine connections of the document by matching one or more characteristics of the document with characteristics of other documents and/or objects. For example, a document may include information relating to an event including structured information that may provide/identify characteristics of the document (e.g., characteristics of the event, characteristics of information relating to the event). Based on the characteristics provided/identified by the structured information, the connection engine 116 may determine connections of the document. For example, the structured information of the document may provide/identify a given investigation (e.g., via an investigation identifier). Here, the connection engine 116 may determine connections/associations between the document and other documents that also include structured information providing/identifying the same given investigation (e.g., via the same investigation identifier). Similarly, the connection engine 116 may determine connections/associations between the document and other objects having shared characteristics (e.g., sharing the same investigation identifier).

In various embodiments, the format engine 118 may be configured to format the unstructured information into formatted information. Formatting the unstructured information into formatted information may facilitate users' comprehension/utilization of the information. The formatted information may provide a user-friendly view of the unstructured information (e.g., narratives, blobs of text). For example, the unstructured information may include a narrative provided as lower-case/ALLCAPS text, a narrative not utilizing different typography to highlight certain information within the narrative, and/or a narrative not including spacing that allows users to easily distinguish groupings/sets of information. The format engine 118 may format the unstructured information by changing the capitalization, typography, or the spacing of the unstructured information.

In some embodiments, changing the capitalization may include changing lower-case/ALLCAPS text to Sentence Caps format—capitalizing the first letter of each sentence rather than every letter. In some embodiments, formatting the unstructured information using Sentence Caps format may include capitalizing certain terms which are normally capitalized (e.g., first letters in names, letters in acronyms). Other changes in capitalization of the unstructured information are contemplated.

In some embodiments, changing the typography may include changing one or more of color, font, size, italics, bold, underline, and/or other typography of letters/words/terms. For example, particular terms of importance/potential importance in the document may be called out for view by users by changing color, font, size, italics, bold, underline, and/or other typography of the terms. In some embodiments, the typography of different letters/words/terms may be changed differently. For example, letters/words/terms conveying different information/types of information (e.g., currency amounts, dates, physical/email addresses, phone numbers) may be changed differently (e.g., different color, different font, different size). Other changes in typography of the unstructured information are contemplated.

In some embodiments, one or more of the letters/words/terms that are formatted/changed (collectively "key terms") may be identified by matching one or more preset letters/words/terms. The format engine 118 may utilize preset/previously specified information to identify the key terms within the unstructured information. For example, the format engine 118 may access information (e.g., listing) of preset/specified letters/words/terms previously identified/entered by users as being important/potentially important, and the format engine 118 may change/format these letters/words/terms within the unstructured information. As another example, the format engine 118 may identify key terms within the unstructured information based on analysis of the document, other (related) documents, and/or other (related) objects. For example, the format engine 118 may analyze the document, other (related) documents, and/or other (related) objects to identify commonalities among the documents and the other documents/objects. For example, analysis of the document/other documents/other objects may reveal that multiple entities (e.g., persons) are sharing characteristics normally associated with a single entity (e.g., social security number). In response, names/identifiers of the multiple entities and/or the shared characteristic may be identified as key terms.

In some embodiments, matching key terms may require strict matching (e.g., letter-per-letter) between the letters/words/terms in the unstructured information and the key terms. In some embodiments, matching key terms may not require strict matching between the letters/words/terms in the unstructured information and the key terms. For example, different variations on the key terms (e.g., different affixes/tenses, such as the key term including "withdraw" and the unstructured information including "withdrawal" or "withdrew") may be factored into matching the key terms within the unstructured information. In some embodiments, users may be provided options to determine the level of acceptable variance for matching key terms.

In some embodiments, changing the spacing may including adding/removing/modifying spacing within the unstructured information. For example, a narrative relating to an event may separate different types of information using different spacing (e.g., double spacing, triple spacing). The different types of spacing may be changed to indicate separation of information/types of information. For example, quadruple spacing between groupings of texts may be replaced with TABs while triple spacing between groupings of texts may be replaced with Paragraph Breaks. As another example, particular spacing may be changed within the unstructured information based on a particular letter/word/term within the unstructured information (e.g., adding a Paragraph Break following/preceding a particular term). Particular spacing may be changed within the unstructured information based on a particular combination of letters/words/terms within the unstructured information (e.g., adding a TAB following/preceding a particular combination of words, adding a TAB between particular terms). Other changes in spacing within the unstructured information are contemplated.

In some embodiments, the unstructured information may be formatted based at least on part on the structured information. For example, the structured information may indicate/include information on how the unstructured information should be formatted. For example, the structured information may identify the type of formatting (e.g., capitalization, typography, spacing) to be performed on some or all of the unstructured information. The structured information may define key terms to identify within the unstructured information and/or how the identified terms within the unstructured information should be formatted.

In some embodiments, the format engine 118 may be configured to format the unstructured information based on user input. For example, different formatting options (e.g., capitalization, typography, spacing) for the unstructured information may be provided to users (e.g., via user interface, API) and the users may select the particular formatting desired for the unstructured information. The format engine 118 may format the unstructured information in accordance with the formatting option(s) selected by the users.

In various embodiments, the interface engine 120 may be configured to provide one or more interfaces. The interface(s) may include application program interface(s) and/or user interface(s). The interface(s) may enable presentation of (1) the formatted information, and/or (2) the connections of the document. For example, the interface engine 120 may provide one or more APIs that may be used by users/computing systems to view the formatted information and/or the connections of the document. As another example, the interface engine 120 may provide one or more user interfaces (e.g., web user interface accessible through a browser) through which users may enter/select commands to view the formatted information and/or the connections of the document.

In some embodiments, the interface(s) may be used to view a listing of related documents and/or related objects. For example, the interface(s) may be used to view a listing of related documents. The documents/objects may be related based on one or more connections, such as based on one or more common characteristics. For example, multiple documents and/or objects may be related based on sharing a common investigation identifier. Users may use the listing to view additional information relating to the displayed documents and/or objects (e.g., by clicking on the documents/objects). The listing of documents may provide the related documents in a chronological order, in an alphabetical order, based on ranking/rating (e.g., of importance), and/or other orders. Providing the documents in a chronological order may enable users to review the documents based on time and analyze the documents/information within the documents based on occurrences/reporting in times.

In some embodiments, the interface(s) may enable searching for one or more documents and/or one or more objects. For example, referring to the example above relating to a listing of related documents, a given document may be searched for among multiple documents using search terms, filters, and/or other searching methods. For example, the interface(s) may enable a user to search for document having a particular investigation identifier. In some embodiments, the search criteria (e.g., search term) may be highlighted (e.g., via a particular topology) within the documents.

A view of a document via the interface(s) may include a view of the formatted information. In some embodiments, the interface(s) may provide users with an option to see an unformatted version of the document (unstructured information). In some embodiments, the interface(s) may provide users with options to select the formatting to be performed on the unstructured information.

In some embodiments, a view of a document via the interface(s) may include highlighting of one or more key terms within the formatted document. For example, a view of a document may include a listing (e.g., summary) of key terms found within the document. The key terms may be listed in an alphabetical order, based on ranking/rating (e.g., of importance), based on counts of the terms within the document, based on chronology of appearance, and/or other orders. Responsive to a user's selection of a given key term within the listing, the given key term may be highlighted within a view of the formatted information. In some embodiments, variation(s) of the given key term may similarly be highlighted within the view of the formatted information.

In some embodiments, a view of a document via the interface(s) may include other information relating to the document. For example, the view of the document may include information relating to terms identified in the document, counts of those terms within the document, the properties of the document, and/or other documents/objects related to the document. As another example, a view of a document may include information relating to entities involved in the subject of the document, and/or other subjects relating to the document. Information on related documents/objects may be provided via one or more graphical views including graphs of connections/associations. As another example, a document may be part of an investigation (as identified by an investigation identifier) and the view of the document may include listing of related investigations.

In some embodiments, the interface(s) may be used to view a graphical view of related documents and/or related objects. Individual documents/objects may be displayed as nodes within a connected graph, where connections between the nodes indicate common characteristics. Users may use the graphical view (e.g., by clicking on the documents/objects) to view additional information relating to the displayed documents and/or objects. Users may use the graphical view (e.g., by clicking on the connections between the nodes) to view additional information relating to connections between the documents/objects. Other uses of the graphical view of documents/objects are contemplated.

In some embodiments, the interface(s) may be used to view geographical information (e.g., a map) of related documents and/or related objects. For example, visuals (e.g., icons) relating documents/objects may appear on a map based on the geo-location of the documents/objects. Providing a map view of related documents and/or related object may enable users to review the documents/objects based on locations and analyze information based on the respective locations between the documents/objects.

FIG. 2 illustrates an example formatting of unstructured information 200 into formatted information 250. The unstructured information 200 may include information stored without any particular structure/organization/pattern or information stored using structure/organization/pattern that is not conducive to user comprehension/utilization of the information. The unstructured information 200 may provide details (e.g., narratives, blobs of text) regarding one or more subject(s). For example, the unstructured information 200 may include a narrative relating to an event. The narrative relating to the event may not be formatted to facilitate users' comprehension/utilization of the narrative. For example, as shown in FIG. 2, the narrative may be provided as ALLCAPS text. The narrative may not utilize different typography to highlight certain information within the narrative. The narrative may not include spacing that allows users to easily distinguish groupings/sets of information.

The unstructured information 200 may be formatted into the formatted information 250. Formatting the unstructured information 200 into the formatted information 250 may facilitate users' comprehension/utilization of the information. The formatted information 250 may provide a user-friendly view of the narrative contained within the unstructured information 200. For example, as shown in FIG. 2, the unstructured information 200 may be formatted by changing the capitalization, the typography, and the spacing of the unstructured information 200.

Changing the capitalization of the unstructured information 200 may include changing ALLCAPS text of the unstructured information 200 to Sentence Caps format of the structured information 250—capitalizing the first letter of each sentence rather than every letter. In some embodiments, using Sentence Caps format may include capitalizing certain terms which are normally capitalized (e.g., first letters in names, letters in acronyms). Other changes in capitalization of the unstructured information are contemplated.

Changing the typography of the unstructured information 200 may include changing one or more of color, font, size, italics, bold, underline, and/or other typography of letters/words/terms. For example, particular terms of importance/potential importance may be called out for view by users by changing color, font, size, italics, bold, underline, and/or other typography of the terms. In some embodiments, the typography of different letters/words/terms may be changed differently. For example, letters/words/terms conveying different information/types of information (e.g., currency amounts, dates, physical/email addresses, phone numbers) may be changed differently (e.g., different color, different font, different size). For example, as shown in FIG. 2, "term-A" and "term-C" may be bolded and italicized. "Term-D" may be italicized. "Term-B" may be bolded, italicized, and underlined. Currency amounts may be underlined. Email addresses and dates may be bolded. Other changes in typography of the unstructured information are contemplated.

Changing the spacing may including adding/removing/modifying spacing within the unstructured information. For example, a narrative relating to an event may separate different types of information using different spacing (e.g., double spacing, triple spacing). The different types of spacing may be changed to indicate separation of information/types of information. For example, quadruple spacing between groupings of texts may be replaced with TABs while triple spacing between groupings of texts may be replaced with Paragraph Breaks. As another example, particular spacing may be changed within the unstructured information based on a particular letter/word/term within the unstructured information (e.g., adding a Paragraph Break following/preceding a particular term). Particular spacing may be changed within the unstructured information based on a particular combination of letters/words/terms within the unstructured information (e.g., adding a TAB following/preceding a particular combination of words, adding a TAB between particular terms). For example, as shown in FIG. 2, two paragraph spacing may be added to separate the narrative into three paragraphs. Other changes in spacing within the unstructured information are contemplated.

Figure 3:
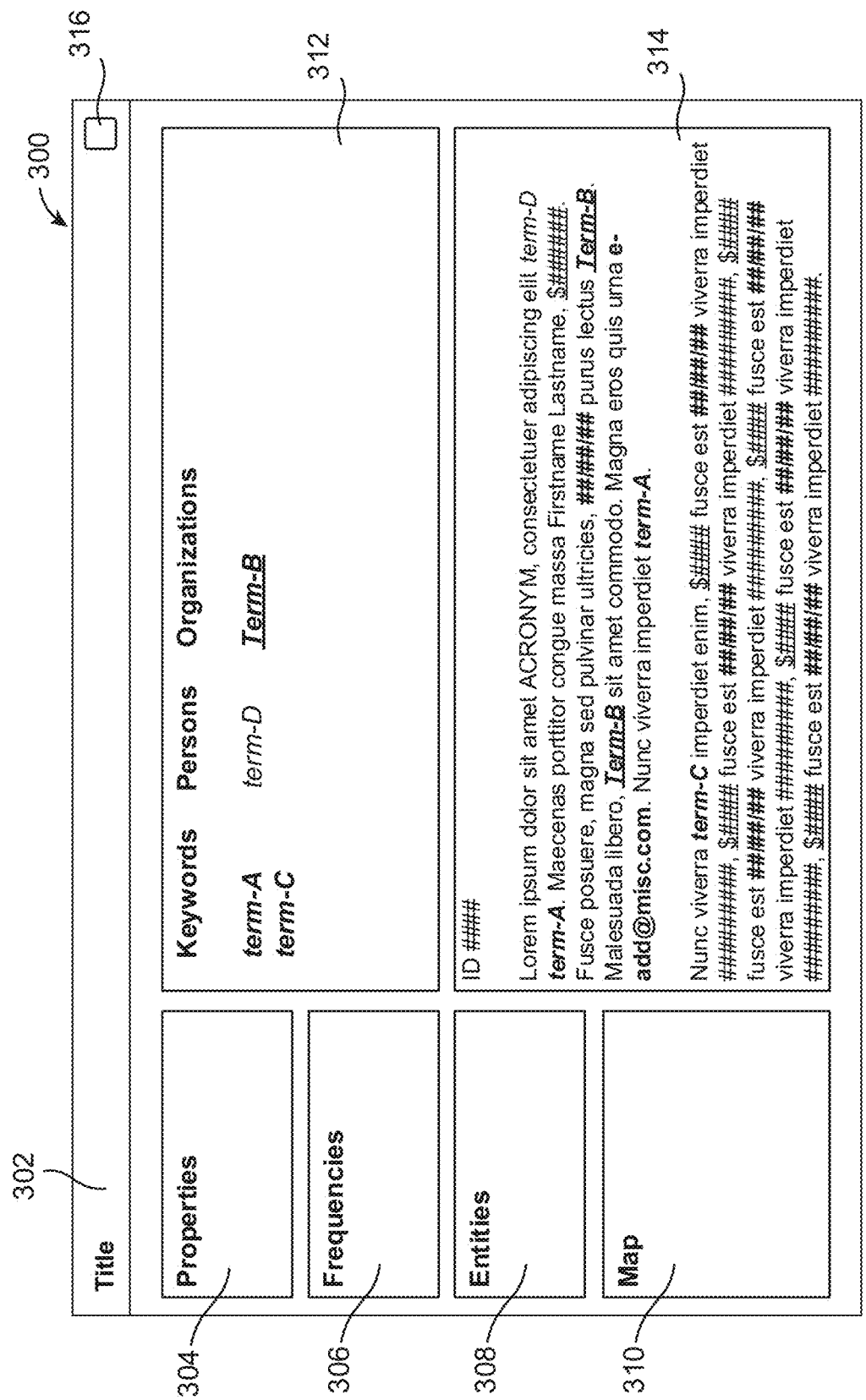
FIG. 3 illustrates an example interface for providing information, in accordance with various embodiments.
Figure 4:
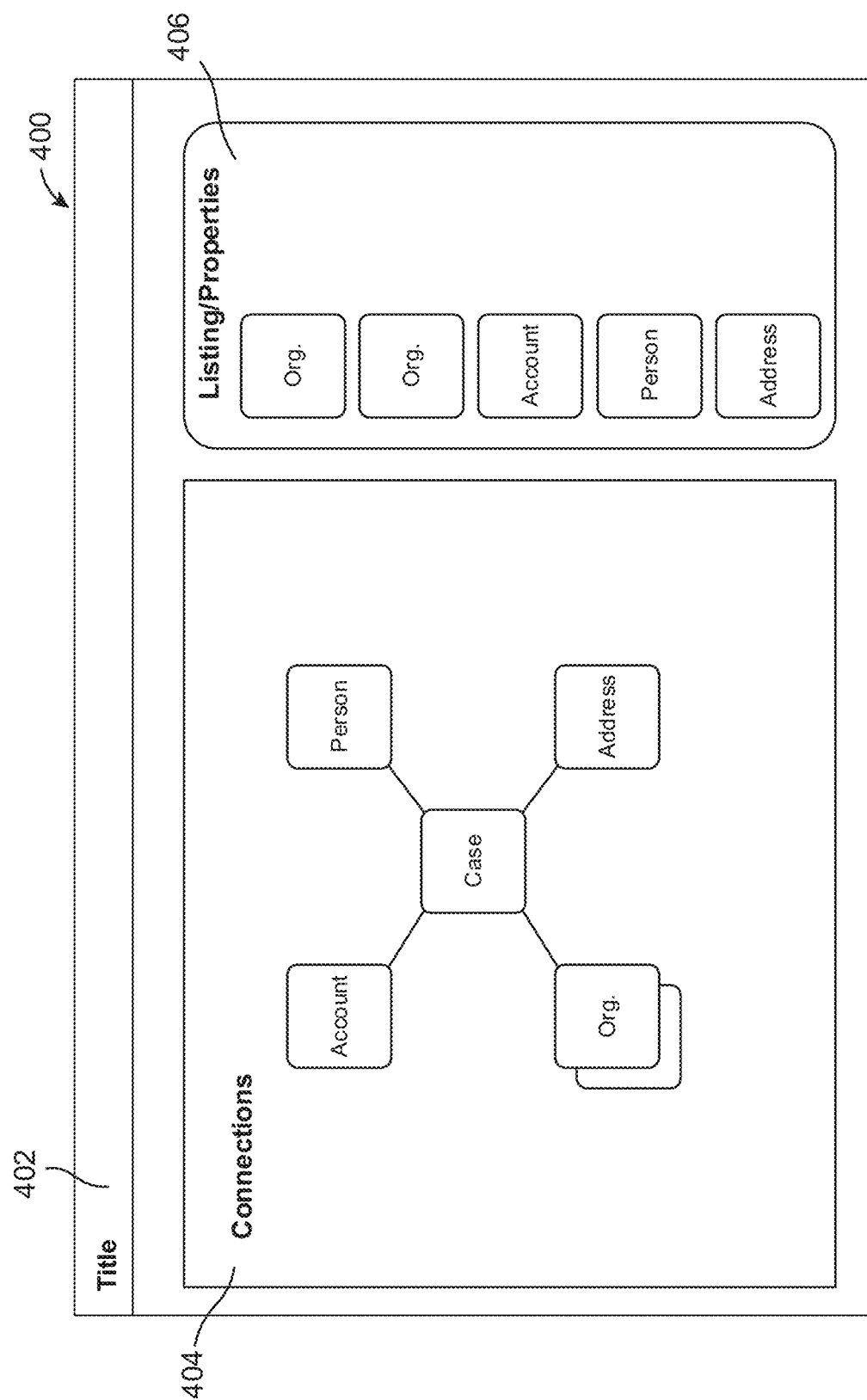
FIG. 4 illustrates another example interface for providing information, in accordance with various embodiments.
Figure 5:
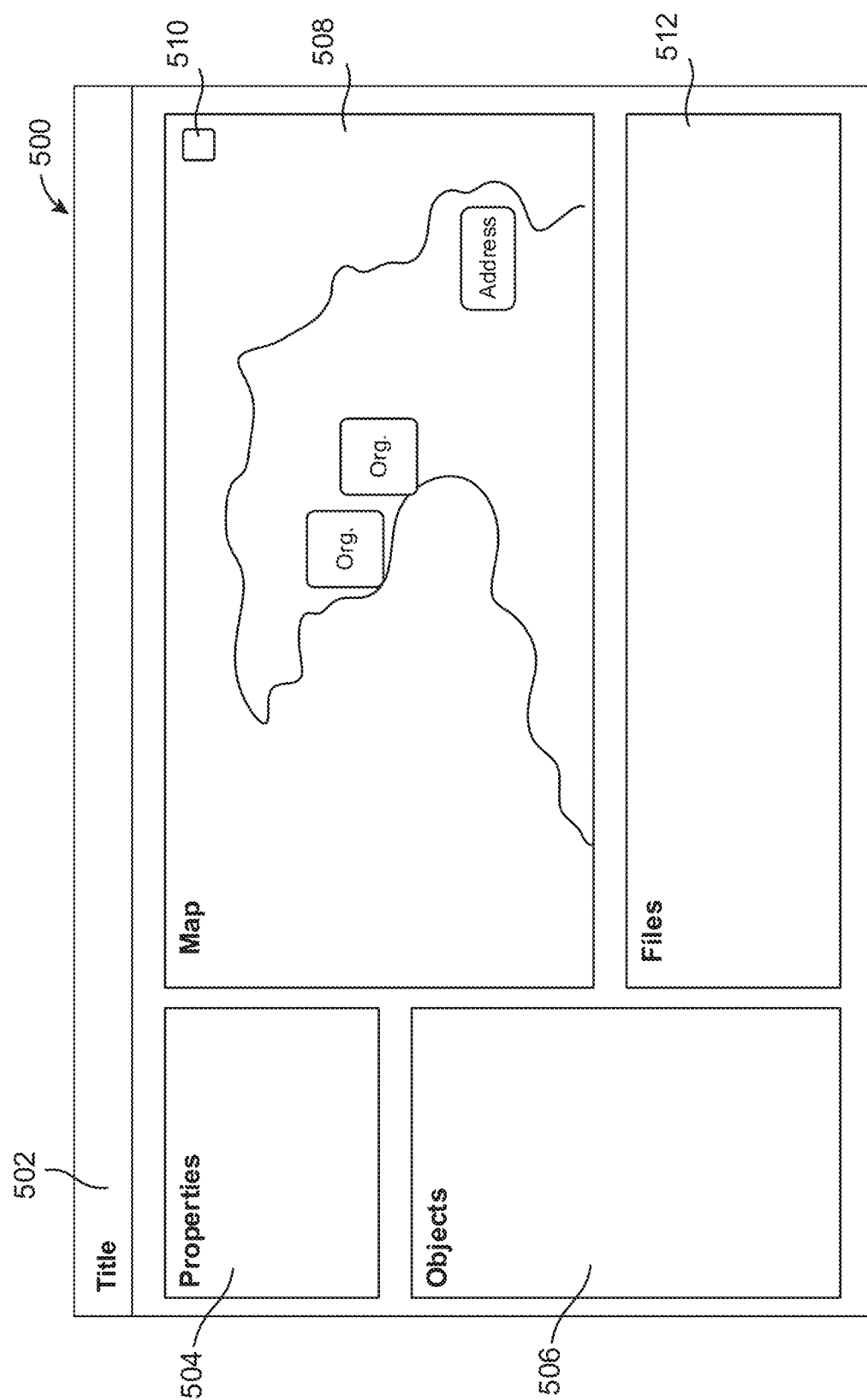
FIG. 5 illustrates yet another example interface for providing information, in accordance with various embodiments.

FIGS. 3-5 illustrate example user interfaces 300, 400, 500 for providing information, in accordance with various embodiments. In various embodiments, the user interfaces 300, 400, 500 may be accessed through a software application running on a computing device (e.g., computers, mobile phones, tablets, etc.) that includes one or more processors and memory. For example, the user interfaces 300, 400, 500 may be accessible through a web browser. In another example, the user interfaces 300, 400, 500 may be provided through a data analysis application. In yet another example, the user interfaces 300, 400, 500 may be provided as a service over a network (e.g., software as a service). Depending on the computing device, the user may be able to interact with the user interfaces 300, 400, 500 using various input devices (e.g., keyboard, mouse, etc.) and/or touch gestures. The user interfaces 300, 400, 500 are provided merely as examples and, naturally, the arrangement and configuration of such user interfaces can vary depending on the implementation. Thus, depending on the implementation, the user interfaces 300, 400, 500 may include additional features and/or alternative features. The user interfaces 300, 400, 500 may include/enable one or more functionalities of the interface(s) described with respect to the computing system 102/components of the computing system 102.

Referring to FIG. 3, the user interface 300 may include a title section 302. The title section 302 may provide title information relating to an accessed document. For example, the title section 302 may provide information relating to title/name of the document. A properties section 304 may provide information relating to properties of the document, properties of the subject of the document, properties of entities included in the document, properties of activities/events described in the document, and/or other information. A frequencies section 306 may provide information relating to frequencies/count of certain letters/words/terms appearing within the document. The frequencies/count may be provided numerically (e.g., numbers reflecting the count of terms within the document) or visually (e.g., terms being listed in order of frequency/count, terms of greater frequency/count appearing larger than terms of lesser frequency/count). An entities section 308 may provide information relating to entities included in the document. The entities section 308 may provide a listing of entities included in the document. The entities section 308 may provide properties of the entities included in the document. In some embodiments, users may interact with the entities section 308 to view additional information about particular entities (e.g., view additional information about a given entity by clicking on the name of/icon representing the given entity). A map section 310 may display one or more maps of area associated with the subject/entities/activities/events of the document.

A summary section 312 may provide information relating to particular letters/words/terms identified within unstructured information of the document. For example, the summary section 312 may provide a summary of key terms found within a narrative of the document. Key terms may include particular keywords, particular individuals, particular organizations, and/or other key terms. For example, the summary section may list keywords "term-A" and "term-C," a person "term-D," and an organization "term-B" within the summary section 312. The listing of different key terms within the summary section 312 may be visually distinguished from each other. For example, keywords, persons, and organizations found within the document may be highlighted/colored differently. Usage of other types of differing typography are contemplated. In some embodiments, interacting with a given key term within the summary section 312 may highlight the corresponding term within a viewing section 314.

The viewing section 314 may provide a view of formatted information. The view of the formatted information may provide a user-friendly view of the narrative contained within the document. In some embodiments, typography of key terms within the viewing section 314 may match the typography of key terms within the summary section 312. For example, the "term-A" and the "term-B" may be bolded and italicized in both the summary section 312 and the viewing section 314. In some embodiments, the presentation of information within the viewing section 314 may be changed based on users' interactions with option 316. The option 316 may enable users to select one or more particular formatting for the presentation of information within the viewing section 314. For example, users may interact with the option 316 to determine (1) whether to utilize Sentence Caps format within the viewing section 314, (2) whether to use highlighting of key terms within the viewing section 314, (3) whether to include particular spacing within the viewing section 314, and/or to turn on/off other formatting options for the document.

In some embodiments, the user interface 300 may provide other information relating to the accessed document. For example, one or more of the above described sections and/or other sections may include information regarding related subjects/cases. Users may interact with the related subjects/cases to see more information about the related subjects/cases. Views of other information relating to the accessed document are contemplated.

Referring to FIG. 4, the user interface 400 may include a title section 402. The title section 402 may provide title information relating to an accessed document. A connection viewer section 404 may provide information relating to connections of the document. For example, the connection viewer section 404 may provide a view of connections of the document. The document may relate to a case/investigation, which may be identified based on an investigation identifier. Other documents/objects sharing the same investigation identifier may be displayed within the connection viewer section 404, and the connection may be identified by lines. For example, a given case/investigation of the document may be related to an account, a person, an address, and two organizations. Connections to multiples of the same type of thing (e.g., connections to multiple organizations) may be displayed separately (individual organization and individual connections shown separately) or may be displayed in combination (e.g., multiple organizations shown by stacked boxes/numbers indicating number of organizations).

The connections of documents shown within the connection viewer section 404 may include first degree connections (e.g., direct connections). In some embodiments, the connection viewer section 404 may display other degrees of connections (e.g., indirect connections). The number of degrees of connections may be determined based on system setting and/or user input. While connections of and things included in/related to the document is shown in the connection view section 404 as straight lines and boxes, respectively, other visual representations of connections of a document are contemplated.

A listing/properties section 406 may display a listing of things (e.g., documents, objects, etc.) to which the document is connected and the properties of the connected things. For example, as shown in FIG. 4, the listing/properties section 406 may display the connected things shown in the connection viewer section 404. The listing/properties section 406 may display properties of the connected things (e.g., next to the box representing the connecting things). The listing/properties section 406 may display additional information relating to one or more things/connections. For example, based on a user's selection of a particular box within the connection viewer section 404 (e.g., the account box), additional information about the thing represented by the particular box (e.g., the account) may be displayed within the listing/properties section 406.

Referring to FIG. 5, the user interface 500 may include a title section 502. The title section 502 may provide title information relating to an accessed document. A properties section 504 may provide information relating to properties of the document, properties of the subject of the document, properties of entities included in the document, properties of activities/events described in the document, properties of map shown within a map section 508, and/or other information. An objects section 506 may provide information relating to objects (e.g., persons, organizations, documents, events) included in the document/shown within the map section 508. The objects section 506 may provide a listing of objects included in the document. The objects section 506 may provide properties of the objects included in the document. In some embodiments, users may interact with the objects section 506 to view additional information about a particular object (e.g., view additional information about a given object by clicking on the name of/icon representing the given object).

A map section 508 may display one or more maps of area(s) associated with the document (e.g., subject/entities/activities/events of the document). The map section 508 may display geographical information of the relevant area(s) and may display where different things associated with the document are/were located. For example, in FIG. 5, the map section may display a map of a peninsula and may indicate (e.g., via locations of icons/boxes) where on the peninsula two of the organizations related to the document/subject of the document are located, as well as the location of an address (e.g., a home/business address of a connected person) related to document/subject of the document.

Users may interact with map shown within the map section 508 and/or options 510 to change how the map is presented. For example, users may drag the map to see different portions of the map, select one or more of options to see different types of map, and/or select one or more options to change visual representations of objects within the map. Users may interact with representations of objects within the map to see additional information about the objects. For example, based on a user's selection of a particular box within the map section 508 (e.g., address box), additional information about the thing represented by the particular box (e.g., the address) may be displayed.

The files section 512 may provide a listing of files associated with the document/map. For example, the document and/or the displayed portion of the map may be associated with different media files (e.g., pictures, videos, audio recordings). Users may interact with the files section 512 to view/play the media files. In some embodiments, the location(s) associated with the selected/viewed/played media file may be highlighted within the map section 508. For example, a given picture/video may be associated with an address shown in the map section 508, and the address may be highlighted based on a user's selection/viewing/playing of the given picture/video.

Figure 6:
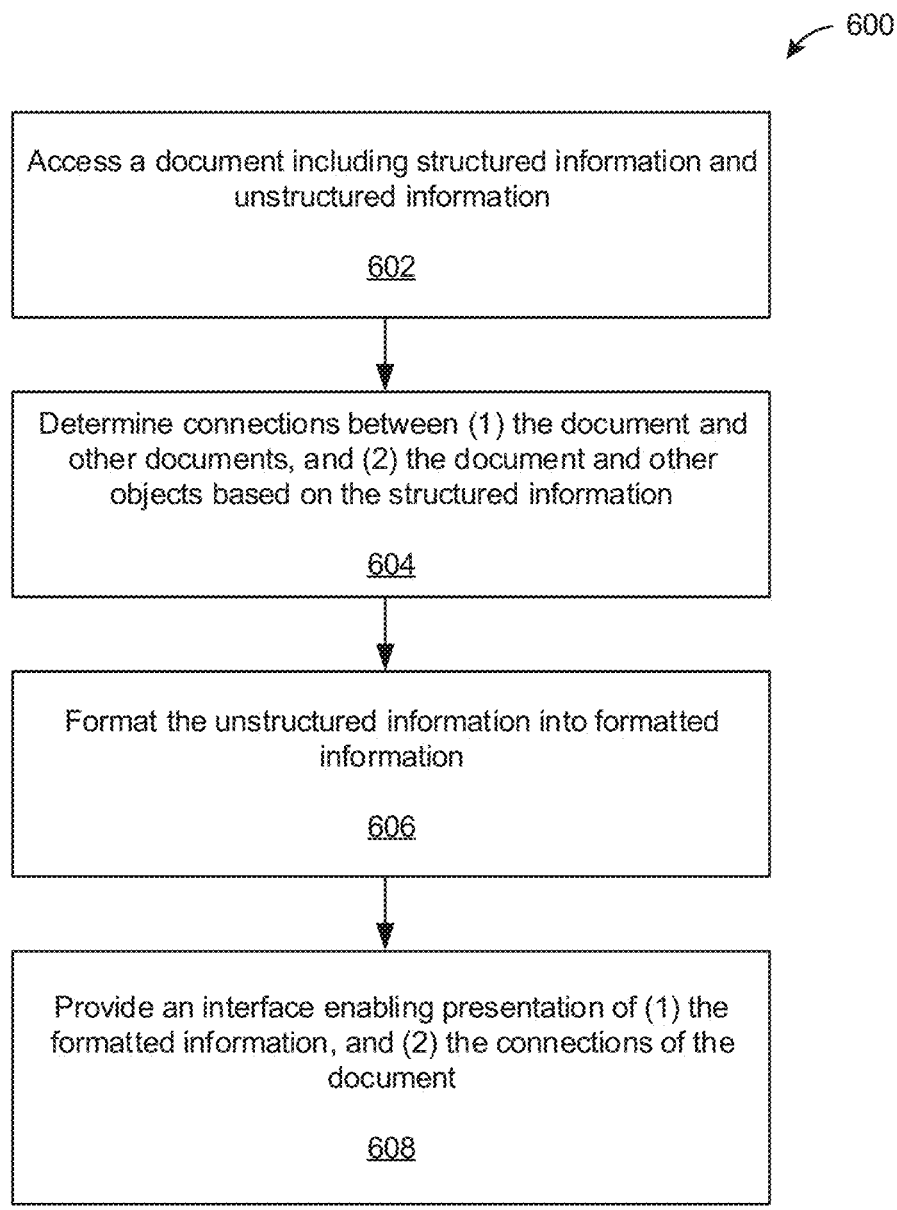
FIG. 6 illustrates a flowchart of an example method, in accordance with various embodiments.

FIG. 6 illustrates a flowchart of an example method 600, according to various embodiments of the present disclosure. The method 600 may be implemented in various environments including, for example, the environment 100 of FIG. 1. The operations of method 600 presented below are intended to be illustrative. Depending on the implementation, the example method 600 may include additional, fewer, or alternative steps performed in various orders or in parallel. The example method 600 may be implemented in various computing systems or devices including one or more processors.

At block 602, a document including structured information and unstructured information may be accessed. At block 604, connections between the document and other documents may be determined based on the structured information. Connections between the document and other objects may be determined based on the structured information. At block 606, the unstructured information may be formatted into formatted information. At block 608, an interface may be provided. The interface may enable presentation of the formatted information and the connections of the document.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
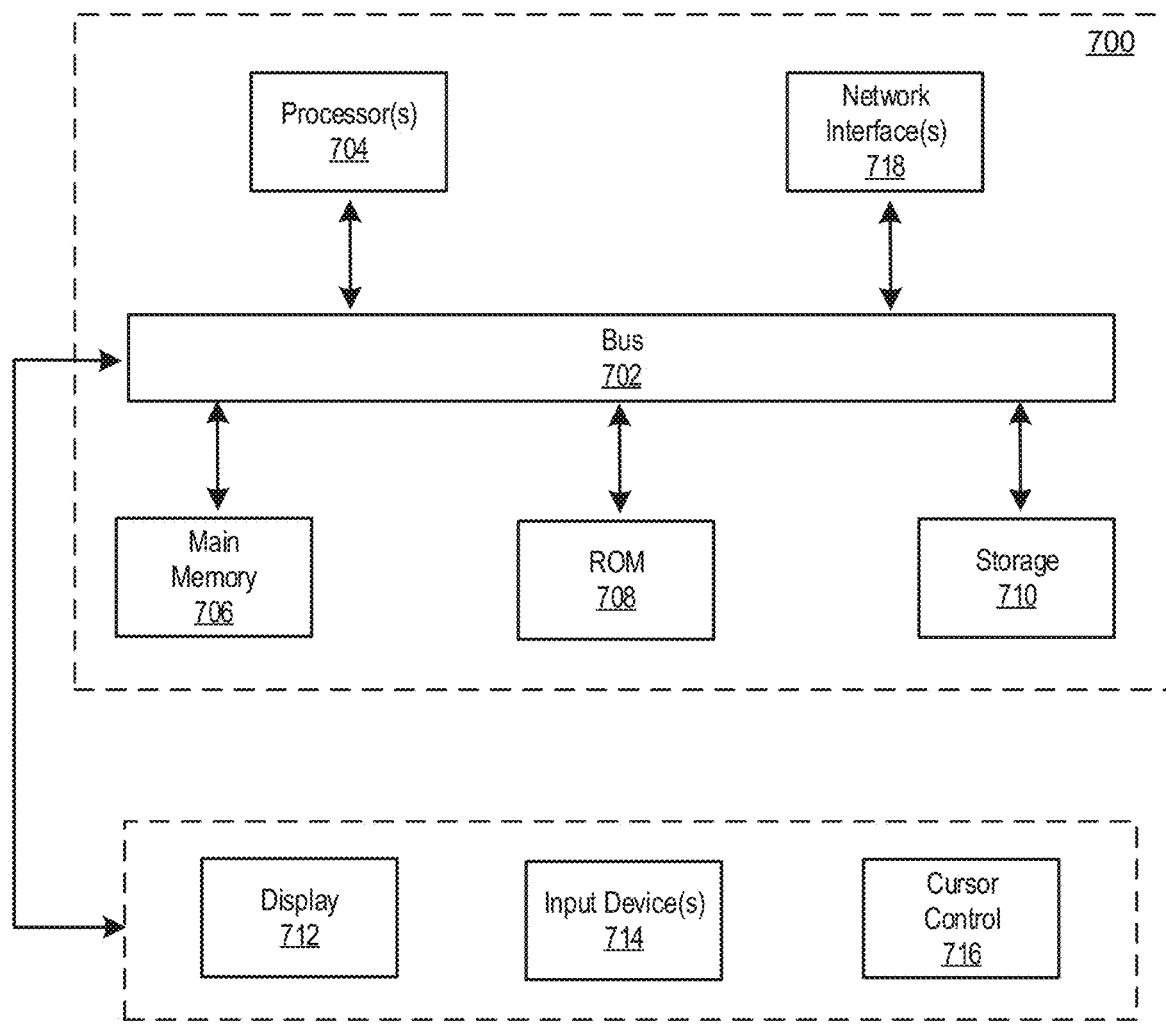
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
   one or more processors; and
   a memory storing instructions that, when executed by the one or more processors, cause the system to perform:

identifying a document relating to an investigation of personally identifiable information (PII), the document indicating that an entity has a characteristic associated with the PII and comprising structured data and unstructured data;

determining connections between the document and other documents associated with another entity and an organization, based on the structured and unstructured data by identifying the other documents sharing the characteristic associated with the III;

identifying names or identifiers of the entity, the another entity, and the organization, and the PII;

determining respective locations of the entity, the another entity, and the organization;

identifying indirectly connected documents associated with the names or identifiers of the another entity and the organization; and providing, through an interface:
    links between the entity, the another entity, the organization, and data from the indirectly connected documents; and
    a map showing the locations of the entity, the another entity, and the organization.

2. The system of claim 1, wherein the interface further enables searching for the document.

3. The system of claim 1, wherein the unstructured data is formatted based at Last in part on the structured data.

4. The system of claim 1, wherein formatting the unstructured data into the formatted data includes changing at least one of capitalization, typography, or spacing of the unstructured data.

5. The system of claim 1, wherein the instructions further cause the system to perform:
identifying key terms within the document;
wherein the interface further enables presentation of highlights of the key terms.

6. The system of claim 5, wherein the key terms are identified based on matching with one or more preset terms.

7. The system of claim 5, wherein the key terms are identified based on analysis of the document, the other documents, or the indirectly connected documents.

8. The system of claim 1, wherein the characteristic associated with the PII comprises a social security number.

9. A method implemented by a computing system including one or more processors and storage media storing machine-readable instructions, wherein the method is performed using the one or more processors, the method comprising:

identifying a document relating to an investigation of personally identifiable information (PII), the document indicating that an entity has a characteristic associated with the PII and comprising structured data and unstructured data;

determining connections between the document and other documents associated with another entity and an organization, based on the structured and unstructured data by identifying the other documents sharing the characteristic associated with the PII;

identifying names or identifiers of the entity, the another entity, and the organization, and the PII;

determining respective locations of the entity, the another entity, and the organization;

identifying indirectly connected documents associated with the names or identifiers of the another entity and the organization; and providing, through an interface:
    links between the entity, the another entity, the organization, and data from the indirectly connected documents; and
    a map showing the locations of the entity, the another entity, and the organization.

10. The method of claim 9, wherein the unstructured data is formatted based at Last in part on the structured data.

11. The method of claim 9, wherein formatting the unstructured data into the formatted data includes changing at least one of capitalization, typography, or spacing of the unstructured data.

12. The method of claim 9, further comprising:
identifying key terms within the document;
wherein the interface further enables presentation of highlights of the key terms.

13. The method of claim 12, wherein the key terms are identified based on matching with one or more preset terms.

14. The method of claim 12, wherein the key terms are identified based on analysis of the document, the other documents, or the indirectly connected documents.

15. A non-transitory computer readable medium comprising instructions that, when executed, cause one or more processors to perform:

identifying a document relating to an investigation of personally identifiable information (PII), the document indicating that an entity has a characteristic associated with the PII and comprising structured data and unstructured data;

determining connections between the document and other documents associated with another entity and an organization, based on the structured and unstructured data by identifying the other documents sharing the characteristic associated with the PII;

identifying names or identifiers of the entity, the another entity, and the organization, and the PII;

determining respective locations of the entity, the another entity, and the organization;

identifying indirectly connected documents associated with the names or identifiers of the another entity and the organization; and providing, through an interface:
    links between the entity, the another entity, the organization, and data from the indirectly connected documents; and
    a map showing the locations of the entity, the another entity, and the organization.

16. The non-transitory computer readable medium of claim 15, wherein the unstructured data is formatted based at least in part on the structured data.

17. The non-transitory computer readable medium of claim 15, wherein formatting the unstructured data into the formatted data includes changing at least one of capitalization, typography, or spacing of the unstructured data.

18. The non-transitory computer readable medium of claim 15, wherein the instructions further cause the one or more processors to perform:
identifying key terms within the document;
wherein the interface further enables presentation of highlights of the key terms.

19. The non-transitory computer readable medium of claim 18, wherein the key terms are identified based on matching with one or more preset terms.

20. The non-transitory computer readable medium of claim 18, wherein the key terms are identified based on analysis of the document, the other documents, or the indirectly connected documents.

* * * * *